(12) United States Patent
Hock

(10) Patent No.: US 9,093,859 B2
(45) Date of Patent: Jul. 28, 2015

(54) DC POWER SYSTEM HAVING A POWER ARCHITECTURE FOR OPTIMIZING EFFICIENCY AND A SYSTEM CONTROLLER OF THE SYSTEM

(75) Inventor: Richard Hock, Farmersville, TX (US)

(73) Assignee: General Electric Company, Schenectady, NY (US)

(\*) Notice: Subject to any disclaimer, the term of this patent is extended or adjusted under 35 U.S.C. 154(b) by 981 days.

(21) Appl. No.: 13/193,429

(22) Filed: Jul. 28, 2011

(65) Prior Publication Data

US 2012/0025616 A1    Feb. 2, 2012

Related U.S. Application Data

(60) Provisional application No. 61/369,143, filed on Jul. 30, 2010.

(51) Int. Cl.
| | | |
|---|---|---|
| H02J 7/00 | (2006.01) | |
| H02J 9/06 | (2006.01) | |
| H02J 9/08 | (2006.01) | |
| H02J 1/00 | (2006.01) | |

(52) U.S. Cl.
CPC .. H02J 9/061 (2013.01); H02J 9/08 (2013.01); H02J 2001/004 (2013.01); H02J 2009/068 (2013.01); Y02B 90/14 (2013.01)

(58) Field of Classification Search
USPC ........................................................ 307/66
See application file for complete search history.

(56) References Cited

U.S. PATENT DOCUMENTS

| | | | |
|---|---|---|---|
| 6,573,682 B1 | 6/2003 | Pearson | |
| 6,761,987 B2 | 7/2004 | Marvin et al. | |
| 7,250,231 B2 | 7/2007 | Edlund | |
| 7,521,138 B2 | 4/2009 | Pearson | |
| 8,344,546 B2 * | 1/2013 | Sarti | 307/64 |
| 2005/0012395 A1 * | 1/2005 | Eckroad et al. | 307/44 |
| 2005/0099750 A1 * | 5/2005 | Takahashi et al. | 361/92 |
| 2006/0078773 A1 * | 4/2006 | Speranza et al. | 429/23 |
| 2007/0278860 A1 * | 12/2007 | Krieger et al. | 307/64 |
| 2010/0066431 A1 * | 3/2010 | Carter | 327/408 |

OTHER PUBLICATIONS

ATIS Exploratory Group on Green, ATIS Report on Wireless Network Energy Efficiency, Jan. 2010, pp. 1-31, Alliance for Telecommunications Industry Standards, Washington, DC.

\* cited by examiner

*Primary Examiner* — Jared Fureman
*Assistant Examiner* — Duc M Pham
(74) *Attorney, Agent, or Firm* — General Electric Company

(57) ABSTRACT

A DC power system and a system controller for the DC power system are disclosed herein. The architecture of the DC power allows optimizing efficiency thereof. In one embodiment, the DC power system includes: (1) a battery configured to provide transitional DC power to a load bus of the DC power system, the battery indirectly coupled to the load bus, (2) a source connection circuit configured to conditionally connect the battery to the load bus and (3) a DC power system controller configured to direct the source connection circuit to connect the battery to the load bus in response to an outage of an AC input of the DC power system.

18 Claims, 2 Drawing Sheets

DC POWER SYSTEM HAVING A POWER ARCHITECTURE FOR OPTIMIZING EFFICIENCY AND A SYSTEM CONTROLLER OF THE SYSTEM

CROSS-REFERENCE TO RELATED APPLICATION

This application claims the benefit of U.S. Provisional Application Ser. No. 61/369,143, filed by Lineage Power Corporation on Jul. 30, 2010, entitled "POWER ARCHITECTURE FOR OPTIMIZING EFFICENCY," commonly assigned with this application and incorporated herein by reference.

TECHNICAL FIELD

This application is directed, in general, to DC power systems and, more specifically, to optimizing the efficiency of DC power systems.

BACKGROUND

A wireless base station or cell site is typically the dominate power consumer for many wireless carriers. Therefore, decreasing the energy used in wireless base stations is important to reducing the energy usage associated with wireless carriers. Cooling the equipment is usually one of the areas of higher energy usage at a cell site. Accordingly, any improvement that reduces energy usage has the additional benefit of reduced cooling expense. Much of the work to date has been focused on individual efforts to improve the efficiency of the components of the system such as the rectifiers, power amplifiers, cooling system, etc.

The service providers require the base station to operate and provide service continuously even during extreme weather conditions and periods of primary power outages. To provide uninterrupted service during power outages a power back-up scheme is required. The requirements vary but it is not unusual to have the back-up system being designed to supply full power for 8 hours or more. Although the loads are generally small, typically less than 15 kW, battery back-up alone may not be practical due to space requirements. Therefore many of the systems use a diesel generator or, more increasingly, fuel cells to provide the long term back-up while the batteries supply the load during transitions. The batteries are connected across the DC bus feeding the load and the bus voltage is maintained by the rectifiers at the float voltage of the batteries, typically 54.5 V or 27.75 V for valve regulated batteries. This ensures the batteries are charged and available to provide the required reserve time during the transition to reserve power.

The power system itself consists of rectifiers which receive an AC input, typically from an electric utility, and convert it to the DC bus voltage. A system controller is also provided which controls the operation of the rectifiers and monitors the power system operation. Some attempts to improve the efficiency of the power system have centered on improving the efficiency of the rectifiers including the light load efficiency, and utilizing the system controller to monitor the bus current and configure the rectifiers to minimize losses.

SUMMARY

One aspect provides a DC power system. In one embodiment, the DC power system includes: (1) a battery configured to provide transitional DC power to a load bus of the DC power system, the battery indirectly coupled to the load bus, (2) a source connection circuit configured to conditionally connect the battery to the load bus and (3) a DC power system controller configured to direct the source connection circuit to connect the battery to the load bus in response to an outage of an AC input of the DC power system.

In another aspect, a controller for a DC power system having a rectifier system, a battery and a load bus is disclosed. In one embodiment, the controller includes: (1) an interface configured to receive operating data associated with the DC power system and (2) an optimizer processor configured to modify a bus voltage on the load bus to minimize AC input power of the rectifier system based on the operating data, wherein the modifying is independent of changing a DC supply input of the battery.

BRIEF DESCRIPTION

Reference is now made to the following descriptions taken in conjunction with the accompanying drawings, in which.

DETAILED DESCRIPTION

Figure 1:
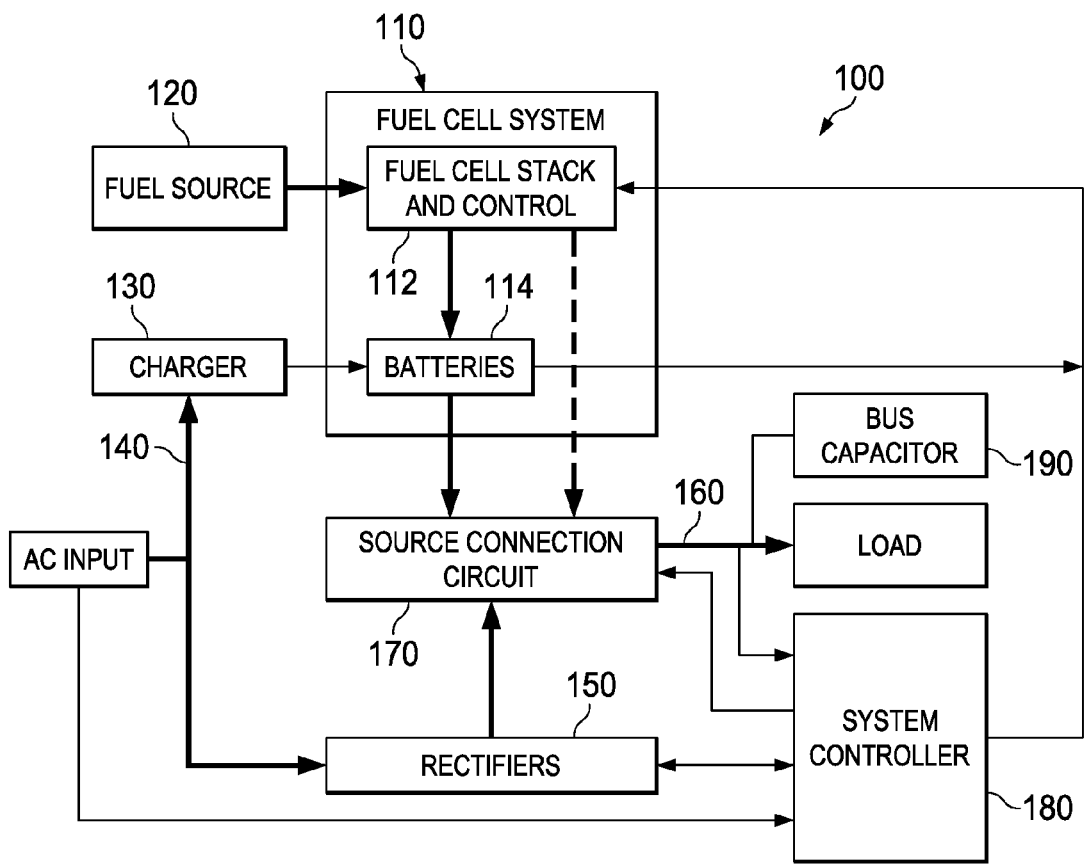
FIG. 1 illustrates a block diagram of an embodiment of a DC power system constructed according to the principles of the disclosure.

The DC load coupled to the DC bus often includes power amplifiers and other electronics that require supply voltages that are lower than the bus voltage and are usually tightly regulated. The loads, therefore, have DC-to-DC converters that convert the bus voltage to the multiple voltages required by the individual circuits in the system. These converters are designed to provide a tightly regulated voltage over the input voltage range to insure that the system operates normally for bus voltage variations due to charging and discharging of the batteries. The DC-DC converters also filter out whatever noise and voltage transients that may occur on the DC bus. The efficiency of these converters is usually a function of the input voltage, the load current, and the operating temperature. The overall system efficiency or power draw from the DC bus is therefore a complex function of the current load on each of the converters, the DC bus voltage, and the operating temperature.

The disclosure recognizes that operating the DC-DC converters at a lower input voltage than the traditional float voltage can lead to higher efficiency for the converters. This may be especially true when the current load on the DC-DC converter is less than its maximum rating. The disclosure, therefore, provides a power architecture for a DC power system with a reserve energy source that utilizes a system controller to adjust the outputs of the DC power system rectifiers to modify the DC bus voltage to maximize the efficiency of the overall DC power system.

One method to do this is to sense and minimize the overall current drawn from the primary AC source. The reserve batteries would be connected to a source connection circuit which upon command from the system controller would connect the batteries to the DC load bus during an AC outage. The reserve batteries, therefore, are not directly coupled or fixed to the DC load bus but instead are indirectly connected to the DC load bus via another device, the source connection circuit.

The source connection circuit is employed to conditionally connect the batteries to the DC load bus. This arrangement allows the DC bus voltage to be adjusted as required to maximize efficiency while still having fully charged batteries in reserve that can be conditionally connected to furnish the DC load until the reserve energy source is up and running. Thus the disclosed architecture may optimize the efficiency of the overall DC power system and account for variations in losses due to temperature, loading, etc. The system controller will monitor the AC current supplied to the rectifiers and control the output voltage of the rectifiers to minimize the AC drain. The system controller can modify the DC bus voltage within limits or constraints built into the system controller. The limits or constraints may be defined for each installation or specified by the service provider. The system controller may use look-up tables to estimate a higher efficiency operating point and use a closed loop method to then measure and optimize the efficiency. The system controller may employ averaging techniques to account for loads that vary or are cyclic. In some embodiments, the system controller may measure and store the operating data as well during operation to continually improve the estimation process. The look-up tables and the operating data may be stored in a memory of the system controller. The system controller may also control rectifier usage and configuration as well to maximize the efficiency and reliability of the rectifier plant. Additionally, the system controller can send status and alarm information to notify the service provider as required. The system controller may also monitor the batteries and their state of charge and may also monitor and provide some control of the reserve energy source.

The disclosed architecture may also include bus capacitors to supply the load during a brief transition time between failure of the AC input and connection of the batteries to the bus. During normal operation the bus needs to have sufficient capacitance to operate fuses, filter noise, etc. This capacitance is comprised of the output capacitance of the rectifiers, the input capacitance of the DC-DC converters distributed in the system, and any additional bus capacitors that may be furnished. The allowable voltage drop on the DC bus during the transition time would be a factor when determining the required overall bus capacitance.

FIG. 1 illustrates a block diagram of an embodiment of a DC power system 100 constructed according to the principles of the disclosure. The DC power system 100 includes a fuel cell as a reserve power source. Accordingly, the DC power system 100 includes a fuel cell system 110 and a fuel source 120. The fuel cell system 110 includes a fuel cell stack and control 112 and batteries 114. Thus, unlike some conventional DC power systems, the batteries 114 are associated with the fuel cell and not directly connected to a bus for the DC load. The fuel cell stack and control 112 may include conventional fuel cells and a conventional fuel cell controller that is configured to manage the operation of the fuel cells. For example, in one embodiment the fuel cell stack and control 112 may include multiple fuels cells that each produces a voltage of approximately one volt. To provide the output voltage required by the DC power system 100, multiple cells can be connected in series to form the fuel cell stack. A fuel cell system controller typically provides control by monitoring and regulating the flow of fuel into the fuel cell to provide the desired output voltage and power. The fuel source 120 provides a fuel that is used by the fuel cell stack to convert chemical energy into electrical energy. In one embodiment, the fuel cell stack may include hydrogen fuel cells and the fuel source 120 may provide hydrogen for the chemical reaction. In other embodiments, the fuel source 120 may provide hydrocarbons, alcohols or another fuel source that corresponds to the type of fuel cells employed in the fuel cell stack and control 112. Hereafter the fuel cell stack and control 112 may be referred to as the fuel cell stack 112 when discussing the fuel cells.

The batteries 114, coupled to the fuel cell stack and control 112, are charged by a battery charger 130 that receives an AC input via an AC bus 140. In some embodiments, a reserve rectifier may be used to maintain an appropriate float voltage on the batteries 114. The batteries 114 and battery charger 130 may be conventional devices that are typically employed in a DC power plant. The AC bus 140 may also be a conventional bus that is used in DC power systems. For example, the AC bus 140 or at least a portion thereof may include a rigid bus and/or cable. The AC bus 140 also provides the AC input to a rectifier system 150. As with conventional rectifiers, the rectifier system 150 is configured to receive the AC input and provide a primary DC power to a load bus 160 of the DC power system 100 during normal operation of the DC power system. The rectifier system 150 is coupled to the load bus 160 via a source connection circuit 170. The source connection circuit 170 may be a controlled switch or switches that can be operated to connect components of the DC power system 100 to the load bus 160. In one embodiment, the source connection circuit 170 may employ a low on-resistance power FET or parallel connection of FETs as a main switch. The source connection circuit 170 may be controlled to quickly switch from an off or blocking state or transition from a high resistance, off-state to the low resistance, on-state in a controlled manner to affect a "soft switch" characteristic. The soft switching may be advantageous if the voltage between the bus voltage and the reserve battery voltage is high enough to cause unwanted current surges. Depending on the current drain from the batteries 114 and the fuel cell stack 112, a contactor may be connected across the FET of FETs to further reduce losses.

The rectifier system 150 is coupled to the load bus 160 via the source connection circuit 170. The source connection circuit 170 may provide a fixed connection to the load bus 160 for the rectifier system 150. As such, the rectifier system 150 would essentially be directly connected to the load bus 160 without a switch. In some embodiments, the rectifier system 150 may be directly connected to the load bus 160 without the source connection circuit 170. In other embodiments, the rectifier system 150 may not be fixed to the load bus 160 but may be indirectly coupled thereto via the source connection circuit 170. In addition to connecting the rectifier system 150 to the load bus 160, the source connection circuit 170 is configured to conditionally connect the batteries 114 to the load bus 160. In the DC power system 100, the source connection circuit 170 is also configured to connect the reserve energy source, i.e., the fuel cell stack, to the load bus 160 via the batteries 114. In other embodiments, as represented by the dashed line in FIG. 1, the batteries 114 may be connected in parallel to the output of the fuel cell stack 112. In some embodiments, paralleling diodes or other types of devices such as FETs may be connected between the fuel cell stack 112 and the batteries 114. The fuel cell stack 112 and the batteries 114, for example, may be connected according to U.S. Pat. No. 6,573,682 or U.S. Pat. No. 6,761,987, which are incorporated herein by reference.

The DC power system 100 also includes a system controller 180. The system controller 180 is configured to direct the source connection circuit 170 to connect the batteries 114 to the load bus 160 in response to an outage of the AC input of the DC power system 100. The system controller 180 is configured to initiate the transition by sending an appropriate control signal to direct the operation of the source connection circuit 170. The system controller 180 may direct the source connection circuit 170 to make a hard switch (step closure) upon transition to the batteries 114 or the system controller 180 may be commanded to provide a soft switch. The soft switch may be desired if there is a substantial difference in voltage between the reserve voltage and the bus voltage at the time of the switch.

As illustrated in FIG. 1, the system controller 180 is configured to communicate with various components of the DC power system 100. The system controller 180 is configured to receive feedback data (or operating conditions) and provide control signals to direct the operation of the DC power system 100. The system controller 180 is coupled to and receives operating data from the batteries 114, the rectifier system 150, the load bus 160 and the AC input. For example, the system controller 180 receives operating data from the AC input to indicate the presence of the AC supply for the DC power system 100. Based on the condition of the AC input, the system controller 180 connects the batteries 114 to the load bus 160. When the AC input is present (normal operating condition), the batteries 114 are not connected to the load bus 160. When the system controller 180 detects that the AC input is interrupted or is not sufficiently present, then the system controller 180 is configured to send a control signal to operate the source connection circuit 170 and connect the batteries 114 to the load bus 160.

Thus, in addition to receiving operating data, the system controller 180 is also coupled to and sends control signals or commands to components of the DC power system 100. For example, the system controller 180 sends control signals to the fuel cell stack and control 112, the rectifier system 150 and the source connection circuit 170. The system controller 180 may include a communications interface to receive the operating data (i.e., feedback data) and transmit the control signals. The type and format of the operating data and control signals communicated (received and transmitted) by the system controller 180 may be conventional data and signals that are communicated in typical DC power systems. The communication paths between the system controller 180 and the various components or apparatuses may also be conventional wired or wireless communication paths used in the industry.

In addition to directing the source connection circuit 170 to conditionally connect the batteries 114 to the load bus 160, the system controller 180 may be further configured to direct the source connection circuit 170 to disconnect the rectifier system 150 from the load bus 160 after initiation of the AC outage. Depending on the design or type, the rectifier system 150 may not have to be disconnected from the load bus while the batteries 114 and then the fuel cell stack 112 supply the load. If the design of the rectifier system 150 would adversely affect the operation of the fuel cell, the source connection circuit may be configured as a break-before-make switch that is controlled by the system controller 180. Disconnecting the rectifier system 150 from the load bus 160 is possible in those embodiments where the source connection circuit 170 employs a switch to couple the rectifier system 150 to the load bus 160.

With the batteries 114 indirectly coupled to the load bus 160 via the source connection circuit 170, the primary DC power provided to the load bus 160 by the rectifier system 150 may be adjusted without adjusting the DC supply to the batteries 114. As such, the system controller 180 is further configured to adjust the primary DC power independent of adjusting a DC supply input of the batteries 114. The system controller 180 may adjust the primary DC power to maximize efficiency of the DC power system 100. For example, the system controller 180 may direct the operation of the rectifier system 150 to provide a voltage to the load bus 160 that is lower than a traditional float voltage e.g., 54.5 volts. With the lower input voltage for the DC-DC converters on the load side of the load bus 160, the converters may operate more efficiently. The system controller 180 may start with a pre-selected voltage or employ an algorithm to find the voltage for the load bus 160 that minimizes the AC input current of the DC power system 100 and therefore operates at a higher plant efficiency. In some embodiments, the system controller 180 may start with the float voltage of the load bus 160 and increment the voltage down to a maximum efficiency point. The system controller 180 can operate in a closed loop fashion to move the bus voltage of the load bus 160 to the point where AC input current of the DC power system 100 is minimized. The minimum AC input current may change as the characteristics of the load changes. For example, certain conditions of the load may cause some of the DC-DC converters supplying their circuits to be more heavily loaded and other DC-DC converters to be at lighter loads. As such, the system controller 180 is configured to change the bus voltage to a new operating point that minimizes the AC input current.

As mentioned above, the system controller 180 monitors and controls the source connection circuit 170. The source connection circuit 170 connects the batteries 114 and reserve power source, the fuel cell stack 112, to the load bus 160 upon command from the system controller 180 upon an AC service interruption. When an AC service interruption occurs, the system controller 180 connects the batteries 114 to the load bus 160 and insures that the fuel cell is brought online. The batteries 114 will power the load connected to the load bus 160 while the fuel cell system 110 initiates energy production. Upon the return of AC power, the system controller 180 sends a command (i.e., a control signal) to the rectifier system 150 to provide the same output voltage or a voltage slightly higher as currently on the load bus 160. In some embodiments, the provided voltage is in a range of 0.1 to 0.5 volts higher. When the rectifier system 150 has picked up the load, the system controller 150 issues a command or commands to the source connection circuit 170 to disconnect the batteries 114 and the fuel cell stack 112 from the load bus 160, arrange for recharging the batteries 114, and commence an orderly shutdown of the fuel cell stack 112.

The system controller 180 may include the functionality of a conventional controller for a DC power system and also be configured to direct the operation of the source connection circuit 170 including the functionality described herein. The system controller 180 may be an apparatus having the necessary hardware, such as a memory and a processor, and software to perform the described functions. The software may be a series of operating instruction stored on a non-transitory computer-readable medium that directs the operation of the processor when initiated thereby. Accordingly, the system controller 180 may include a processor and an associated memory. In one embodiment, the system controller 180 may be a dedicated computing device including the necessary circuitry (including a processor and memory) or software to perform the described functions.

Figure 2:
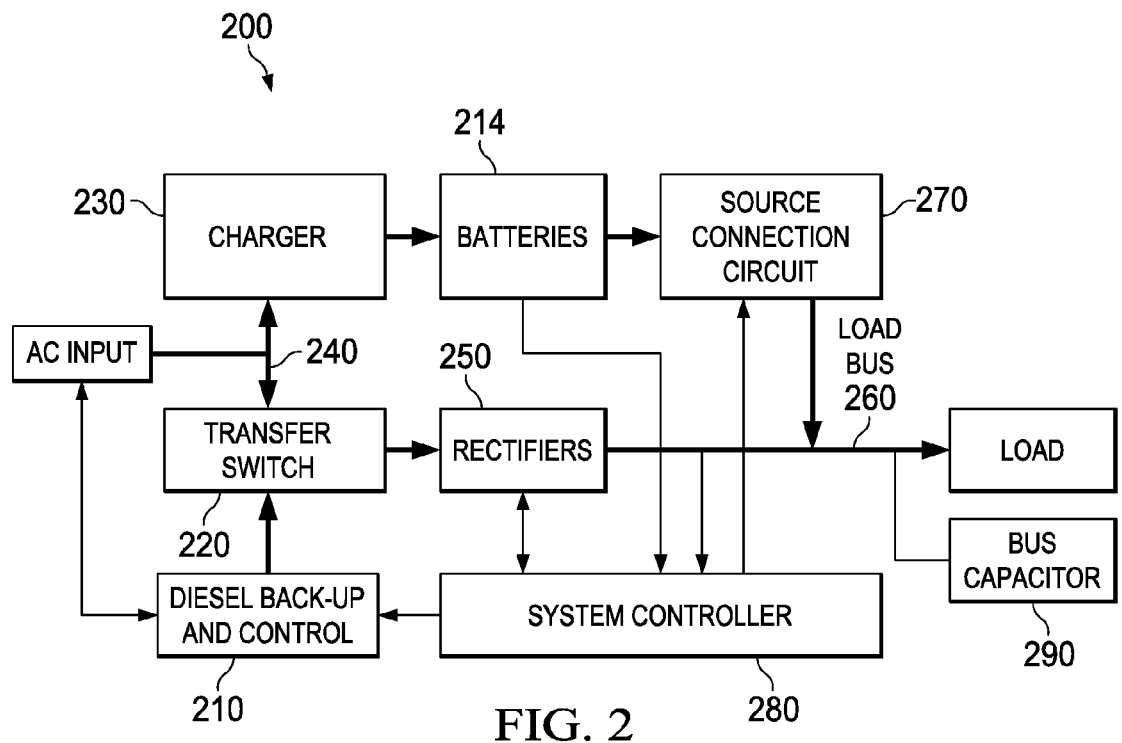
FIG. 2 illustrates a block diagram of another embodiment of a DC power system constructed according to the principles of the disclosure.

FIG. 2 illustrates a block diagram of another embodiment of a DC power system 200 constructed according to the principles of the disclosure. Unlike the DC power system 100, the DC power system 200 employs a diesel generator as a reserve power supply. As such, the DC power system 200 includes a diesel back-up and control 210 and a transfer switch 220. During normal operation, the transfer switch connects the AC input to a rectifier system 250. When there is an interruption in the AC input, the transfer switch 220 opens the connection between the AC input and the rectifier system 250 and connects the diesel back-up and control 210 to the rectifier system 150. The diesel back-up and control 210 then generates an AC input supply for the rectifier system 250 while the AC input is out. The diesel back-up and control 210 includes the necessary control circuitry to determine when the AC input is out, start-up the diesel back-up generator and direct the transfer switch 220 to transfer the input for the rectifier system 250 from the AC input to the diesel back-up and control 210. The diesel back-up and control 210 and the transfer switch 220 may be conventional devices typically employed in DC power systems.

The DC power system 200 also includes batteries 214, a charger 230, a load bus 260 and bus capacitors 290. Each of these devices may be conventional devices. Except for different connections, the batteries 214, the charger 230, the rectifier system 250 and the load bus 260 may operate as their corresponding devices in FIG. 1. The DC power system 200 also includes a source connection circuit 270 and a system controller 280. The source connection circuit 270 may be a controlled switch or switches that can be operated to conditionally connect the batteries 214 to the load bus 260.

The DC power system 200 also includes a system controller 280. The system controller 280 is configured to direct the source connection circuit 270 to connect the batteries 214 to the load bus 260 in response to an outage of the AC input of the DC power system 100. The system controller 280 is configured to initiate the transition by sending an appropriate control signal to direct the operation of the source connection circuit 270. The system controller 280 may direct the source connection circuit 270 to make a hard switch (step closure) upon transition to the batteries 214 or the system controller 280 may be commanded to provide a soft switch.

As illustrated in FIG. 2, the system controller 280 is configured to communicate with various components of the DC power system 200. The system controller 280 is configured to receive feedback data and provide control signals to direct the operation of the DC power system 200. The system controller 280 is coupled to and receives operating data from the batteries 214, the rectifier system 250, the load bus 260 and, via the diesel back-up and control 210, the AC input. Based on the condition of the AC input, the system controller 280 connects the batteries 214 to the load bus 260. Under normal operating conditions, the batteries 214 are not connected to the load bus 260. When the system controller 280 detects that the AC input is interrupted or is not sufficiently present, then the system controller 280 is configured to send a control signal to operate the source connection circuit 270 and connect the batteries 214 to the load bus 260. For short interruptions, the bus capacitors 290 are designed to carry the load on the load bus 260. Depending upon the amount of capacitance, this may be for interruptions of less than a second. If the interruption lasts longer then the source connection switch 270 will connect the batteries 214 to the load bus 260. Depending on the design of the diesel back-up and control 250 and the size of the batteries 214, the diesel control will start-up the diesel generator to insure the diesel generator can supply the plant load before the battery reserve is depleted.

Thus, similar to the system controller 180, in addition to receiving operating data, the system controller 280 is also coupled to and sends control signal to components of the DC power system 200. For example, the system controller 280 sends control signals to the diesel back-up and control 210, the rectifier system 250 and the source connection circuit 270. The system controller 280 may include a communications interface to receive the operating data (i.e., feedback data) and transmit the control signals. The type and format of the operating data and control signals communicated (received and transmitted) by the system controller 280 may be conventional data and signals communicated in typical DC power systems such as industry standard signals. The communication paths between the system controller 280 and the various components or apparatuses may also be conventional wired or wireless communication paths used in the industry.

With the batteries 214 conditionally coupled to the load bus 260, the primary DC power provided to the load bus 260 by the rectifier system 250 may be adjusted without adjusting the DC supply to the batteries 214. Thus the batteries 214 can be charged to the preferred float voltage of the load bus 260 and maintained at full charge. As such, the system controller 280 is further configured to adjust the primary DC power independent of adjusting a DC supply input of the batteries 214. The system controller 280 may adjust the primary DC power to maximize efficiency of the DC power system 200. For example, the system controller 280 may direct the operation of the rectifier system 250 to provide a voltage to the load bus 260 that is lower than a traditional float voltage e.g., 54.5 volts to provide a lower input voltage for DC-DC converters on the load side of the load bus 260.

The system controller 280 may be configured to direct the source connection circuit 270 to maintain the connection of the batteries 214 to the load bus 260 while the reserve energy source (i.e., the diesel generator) is operational and connected to the load bus 260. In this case the system controller 280 would maintain the load bus at the float voltage. In some embodiments, the system controller 280 may be configured to direct the source connection circuit 270 to disconnect the batteries 214 from the load bus 260 after the reserve energy source (i.e., the diesel generator) is operational.

Figure 3:
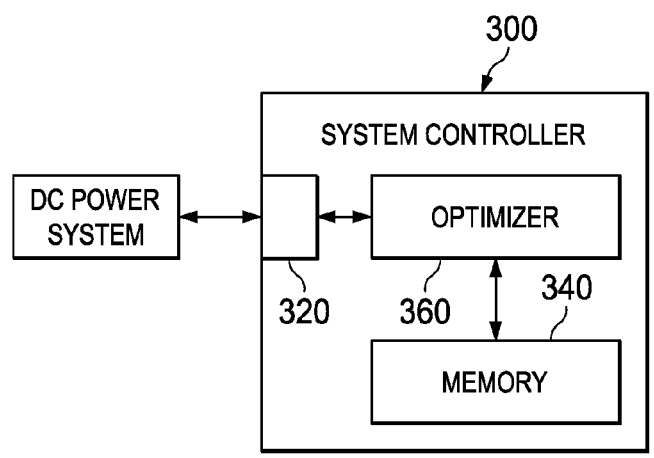
FIG. 3 illustrates a block diagram of an embodiment of a DC power system controller constructed according to the principles of the disclosure.

FIG. 3 illustrates a block diagram of an embodiment of a DC power system controller 300 constructed according to the principles of the disclosure. The system controller 300 includes a communications interface 320, a memory 340 and an optimizer 360. The system controller 300 may be employed in a DC power system such as illustrated in FIG. 1 or in FIG. 2.

The communications interface 320 is configured to receive operating data associated with a DC power system and transmit control signals or commands to devices of the DC power system. The DC power system includes a rectifier system, a load bus, a reserve power system and a battery that is conditionally connected to the load bus via a switch or source connection circuit. The reserve power system may be, for example a fuel cell or a diesel generator.

The memory 340 may be a conventional memory configured to store data. The memory 340 is coupled to the optimizer 360 and is configured to store data associated with operating the DC power system. The data may be operating data associated with the DC power system and algorithms to direct the operation thereof.

The optimizer 360 is configured to modify a bus voltage on the load bus by adjusting an output of the rectifier system based on the operating data, wherein the adjusting is independent of changing a DC supply input of the battery. The optimizer 360 may modify the DC bus voltage during normal operation of the DC power system (i.e., when the AC input is being sufficiently supplied). The optimizer 360 may modify the bus voltage by monitoring an AC current supplied to the rectifier system and control an output voltage of the rectifier system to minimize the AC input power. In one embodiment, the optimizer 360 is configured to modify the bus voltage based on predetermined constraints for the DC power system. One such constraint is the lower operating limit of the DC-DC converters. For example some power amplifier converters have a 36 to 75 volt input voltage operating range. Therefore the lower limit the optimizer 360 would permit is above 36 volts since the system must ensure that the actual voltage at the converter input is above that limit. The optimizer 360 may also be configured to take into account any transients that might cause the voltage to dip into that range. Therefore the optimizer 360 may be designed to limit the minimum bus voltage to 38 volts to provide a margin. A user can modify the margin if desired.

The optimizer 360 may be configured to modify the DC bus voltage based on an estimated higher efficiency operating point for a load connected to the DC load bus. In one embodiment, the optimizer 360 may also be configured to monitor and maximize efficiency of the rectifier system based on the operating data. Accordingly, the optimizer 360 may determine the higher efficiency operating point based on averaging the operating data for the load and update the higher efficiency operating point based on the operating data.

In one embodiment the optimizer 360 may be configured to monitor operation of the battery and the reserve power system. The communications interface 320 receives the operating conditions or feedback data associated with the DC power system. Based on the operating conditions, the optimizer 360 is configured to modify the bus voltage. For example, in one embodiment, the operating conditions may include a temperature associated with the DC power system. The optimizer 360 may adjust a cooling system for the DC power system based on the operating temperature.

The optimizer 360 may be embodied as a processor or a portion thereof. In addition to the above described functionality, the optimizer 360 is configured to conditionally connect the battery to the load bus for an outage of the AC input power of the DC power system. The optimizer 360 may direct a source connection circuit to connect the batteries to the load when the AC input for the DC power system is interrupted.

The above-described optimizer 360, at least a portion of the system controllers (i.e., 180, 280 and 300) and disclosed methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on conventional digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods. Accordingly, computer storage products with a computer-readable medium, such as a non-transitory computer-readable medium, that have program code thereon for performing various computer-implemented operations that embody the tools or carry out the steps of the methods set forth herein may be employed. A non-transitory media includes all computer-readable media except for a transitory, propagating signal. The media and program code may be specially designed and constructed for the purposes of the disclosure, or they may be of the kind well known and available to those having skill in the computer software arts. An apparatus may be designed to include the necessary circuitry or series of operating instructions to perform each step or function of the disclosed methods, optimizer or system controller.

Those skilled in the art to which this application relates will appreciate that other and further additions, deletions, substitutions and modifications may be made to the described embodiments.

What is claimed is:

1. A DC power system, comprising:
   a battery configured to provide transitional DC power to a load bus of said DC power system, said battery indirectly coupled to said load bus;
   a source connection circuit configured to conditionally connect said battery to said load bus;
   a rectifier system configured to receive said an AC input of said DC power system and provide a primary DC power to said load bus during normal operation of said DC power system; and
   a DC power system controller configured to direct said source connection circuit to connect said battery to said load bus in response to an outage of the AC input of said DC power system, said DC power system controller further configured to adjust said primary DC power independent of adjusting a DC supply input of said battery, said DC power system controller further configured to monitor AC current supplied to said rectifier system by the AC input and adjust said primary DC power output by said rectifier system based on the monitored AC current to reduce AC drain.

2. The DC power system as recited in claim 1 further comprising a reserve energy source configured to be a power source to provide DC reserve power for said load bus during said outage.

3. The DC power system as recited in claim 2 wherein said DC power system controller is further configured to direct said source connection circuit to disconnect said battery from said load bus after said reserve energy source is operational.

4. The DC power system as recited in claim 2 wherein said reserve energy source is selected from the group consisting of:
   a diesel generator, and
   a fuel cell.

5. The DC power system as recited in claim 1 wherein said rectifier system is indirectly coupled to said load bus via said source connection circuit.

6. The DC power system as recited in claim 5 wherein said DC power system controller is further configured to direct said source connection circuit to disconnect said rectifier system from said load bus after initiation of said AC outage.

7. The DC power system as recited in claim 1 wherein said DC power system controller is further configured to adjust said primary DC power to maximize efficiency of said DC power system.

8. The DC power system as recited in claim 1 further comprising an auxiliary bus capacitor configured to provide temporary DC power to said load bus.

9. A controller for a DC power system having a rectifier system, a battery and a load bus, wherein said battery is indirectly coupled to said load bus, said controller comprising:
   an interface configured to receive operating data associated with said DC power system; and
   an optimizer configured to modify a bus voltage provided by said rectifier system to said load bus to minimize an AC input power of said rectifier system based on said operating data, wherein said modify is independent of changing a DC supply input of said battery, said optimizer is further configured to monitor an AC current supplied to the rectifier system and control an output voltage of the rectifier system based on the monitored AC current to reduce AC drain.

10. The controller as recited in claim 9 wherein said optimizer is configured to modify said bus voltage based on predetermined constraints for said DC power system.

11. The controller as recited in claim 9 wherein said optimizer is configured to modify said bus voltage based on an estimated higher efficiency operating point for a load connected to said load bus.

12. The controller as recited in claim 11 wherein said optimizer is further configured to determine said higher efficiency operating point based on averaging said operating data for said load.

13. The controller as recited in claim 11 wherein said optimizer is further configured to update said higher efficiency operating point based on said operating data.

14. The controller as recited in claim 9 wherein said optimizer is further configured to monitor and maximize efficiency of said rectifier system based on said operating data.

15. The controller as recited in claim 14 wherein said DC power system further includes a reserve power system and said optimizer is further configured to monitor operation of said battery and said reserve power system.

16. The controller as recited in claim 9 wherein said optimizer is further configured to connect the battery to said load bus for an outage of said AC input power.

17. The controller as recited in claim 9 wherein said interface is further configured to receive operating conditions associated with said DC power system and said optimizer is further configured to modify said bus voltage based on said operating conditions.

18. The controller as recited in claim 17 wherein said operating conditions includes a temperature associated with DC power system and said optimizer is further configured to adjust a cooling system for said DC power system based on said operating temperature.

* * * * *

UNITED STATES PATENT AND TRADEMARK OFFICE
CERTIFICATE OF CORRECTION

| | | |
|---|---|---|
| PATENT NO. | : 9,093,859 B2 | Page 1 of 1 |
| APPLICATION NO. | : 13/193429 | |
| DATED | : July 28, 2015 | |
| INVENTOR(S) | : Hock | |

It is certified that error appears in the above-identified patent and that said Letters Patent is hereby corrected as shown below:

In the specification

Column 6, Line 39, delete "system controller 150" and insert -- system controller 180 --, therefor.

Column 7, Line 55, delete "back-up and control 250" and insert -- back-up and control 210 --, therefor.

In the claims

Column 10, Line 8, Claim 1, delete "receive said an" and insert -- receive an --, therefor.

Signed and Sealed this
Twenty-second Day of March, 2016

Michelle K. Lee
*Director of the United States Patent and Trademark Office*